Figure 1:
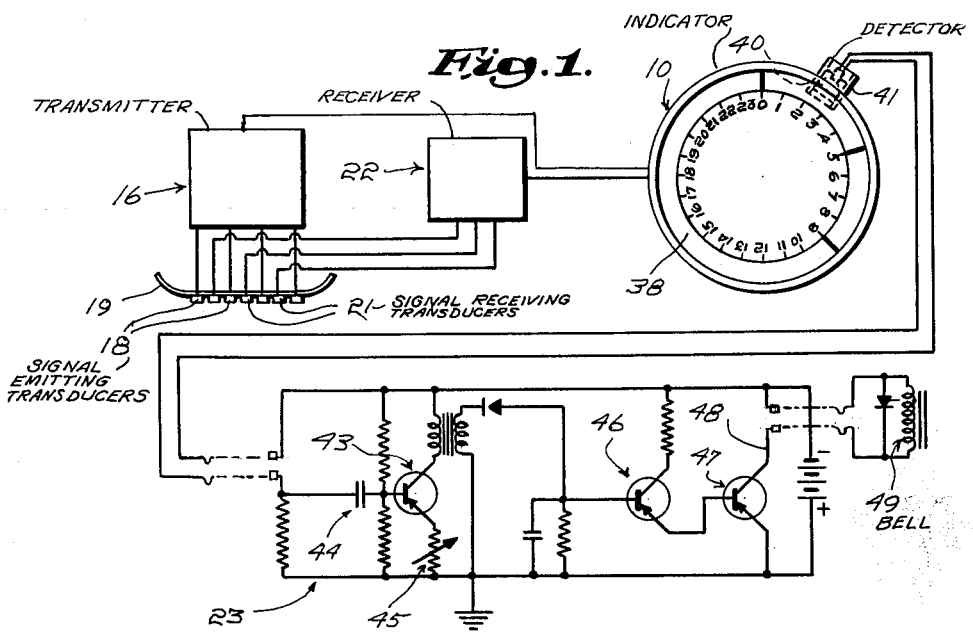

Dec. 28, 1965    A. L. CUDWORTH    3,226,673
DEVICE FOR INDICATING OBJECTS REARWARDLY OF A VEHICLE
Filed June 18, 1962    3 Sheets-Sheet 1

Inventor:
Allen L. Cudworth,
by
Attorney

Dec. 28, 1965  A. L. CUDWORTH  3,226,673
DEVICE FOR INDICATING OBJECTS REARWARDLY OF A VEHICLE
Filed June 18, 1962  3 Sheets-Sheet 2

Inventor:
Allen L. Cudworth,
by Abbott Spear,
Attorney

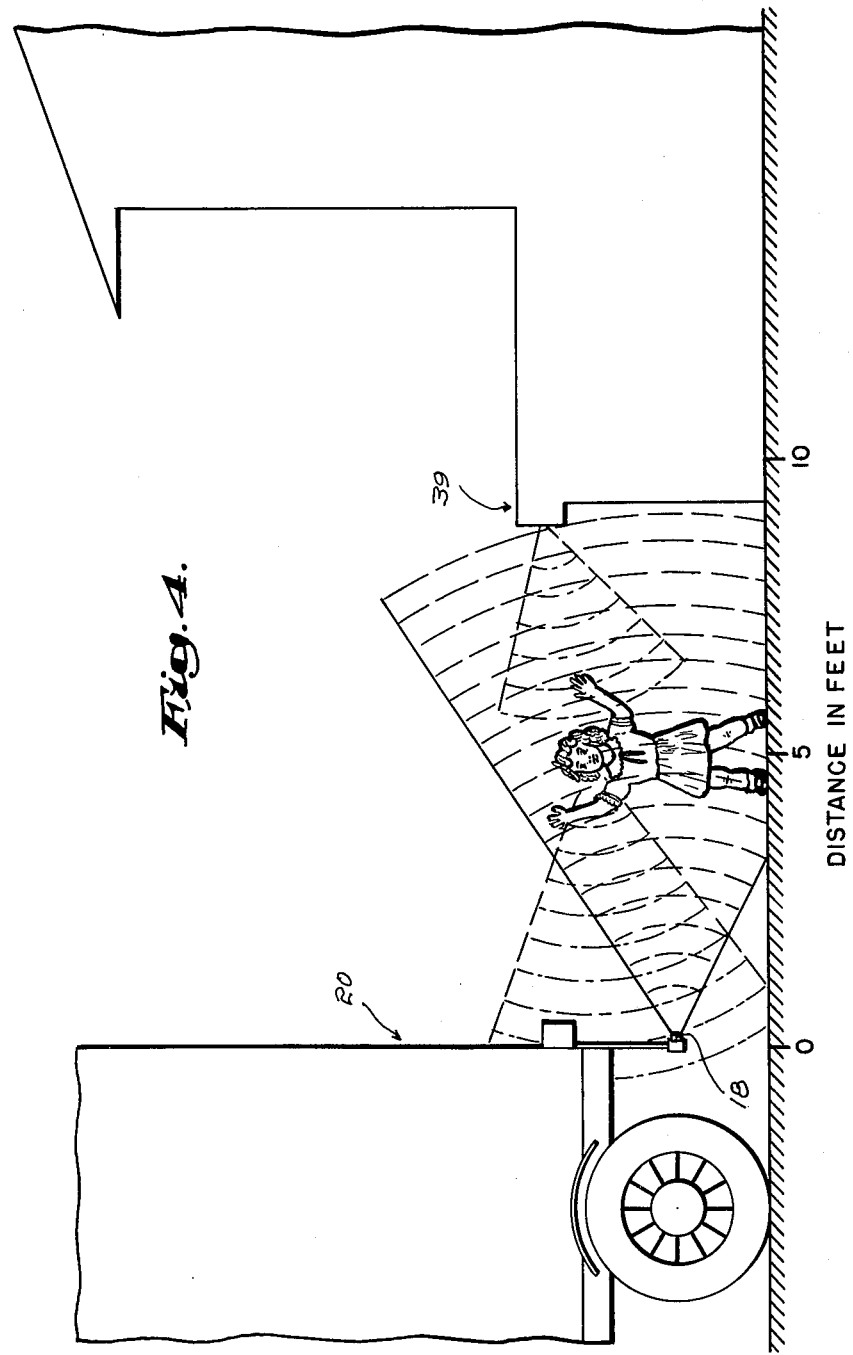

United States Patent Office
3,226,673
Patented Dec. 28, 1965

3,226,673
DEVICE FOR INDICATING OBJECTS REARWARDLY OF A VEHICLE
Allen L. Cudworth, Framingham, Mass., assignor to Liberty Mutual Insurance Company, Boston, Mass., a corporation of Massachusetts
Filed June 18, 1962, Ser. No. 203,053
6 Claims. (Cl. 340—31)

The present invention relates to a device for indicating to the operator the distance between his vehicle and an object towards which it is backing.

While most vehicles are so constructed and designed that the operator has inadequate rear vision, even with the aid of mirrors, this objectionable feature is particularly true of enclosed cargo trucks. Such trucks must be backed up to loading docks and into alleys and must be maneuvered into and out of parking spaces. Accordingly, there is real need for a device to provide the operator with visual indications, where such may be readily observed by him, as to obstacles otherwise hidden from him rearwardly of his truck, to make his work easier, to minimize property damage, and to prevent injury in the event a pedestrian enters the space dangerously close to the vehicle as it is being backed towards a known obstacle.

The principal objective of the present invention is to provide such a device, the device including an ultrasonic ranging system for detecting objects within a predetermined range rearwardly of the vehicle with an emergency or danger signalling circuit that is energized whenever an object is in a part of that range dangerously close to the rearwardly moving vehicle. The system presents the echoed signals as visual indications of distance and, while the emergency circuit can be used for other purposes, it is preferably employed to provide an audible warning of an object closely adjacent the rear of the vehicle.

Another objective of the invention is to provide such a device which includes a conventional system of the type having an indicator provided with a bulb of the gaseous discharge type, a permanent magnet, and means to rotate the bulb and magnet about a common axis. The device also includes pulse generating means having a pick-up coil in the indicator and disposed relative to the path of the magnet so as to generate a pulse on each pass of the magnet. The pulse generating means also has oscillating means and a series of rearwardly disposed signalling emitting transducers disposed transversely of the vehicle. Signal receiving means for receiving pulses reflected from an object within a predetermined range include the bulb, a series of rearwardly disposed signal receiving transducers spaced transversely of the vehicle, and means to convert the received signals into electric bulb-flashing pulses.

In practice, magnetic coupling between the generating means and the receiving means is used to establish a zero or reference flashing of the bulb with flashing thereof, due to reflected signals, being proportional to the distance between the vehicle and an object, because of the travel of the bulb relative to its axis during the interval required for the signal to travel to and from the object.

The invention provides an emergency or danger signalling circuit in combination with that system, the emergency or danger signalling circuit including a photosensitive cell mounted in the indicator and shielded so that it is exposed to flashings of the bulb in a limited, close part of the operative range of the device. The cell controls the emergency circuit to which it is preferably capacitatively coupled, and the emergency or danger signalling circuit includes a safety device, which may be simply a warning bell or buzzer to provide a safe stopping interval.

In the accompanying drawings, there is shown an illustrative embodiment of the invention from which these and other of its objectives, novel features, and advantages will be readily apparent.

Figure 2:
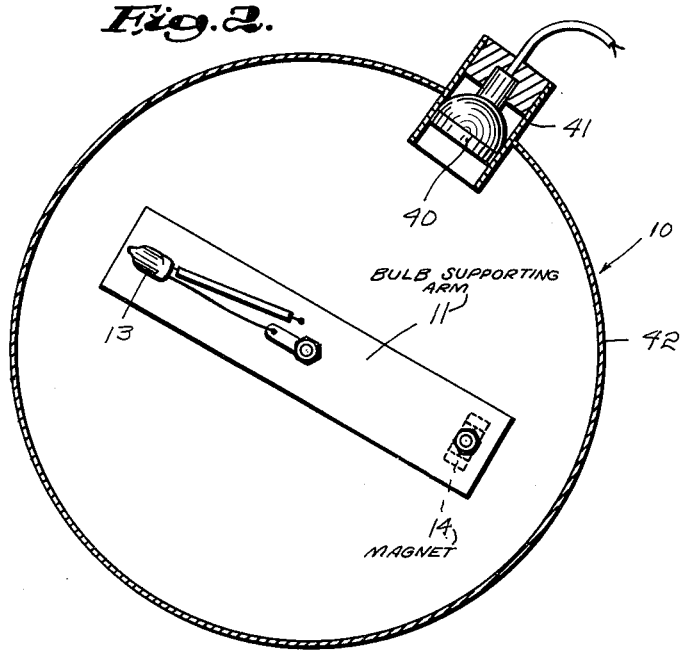
Figure 3:
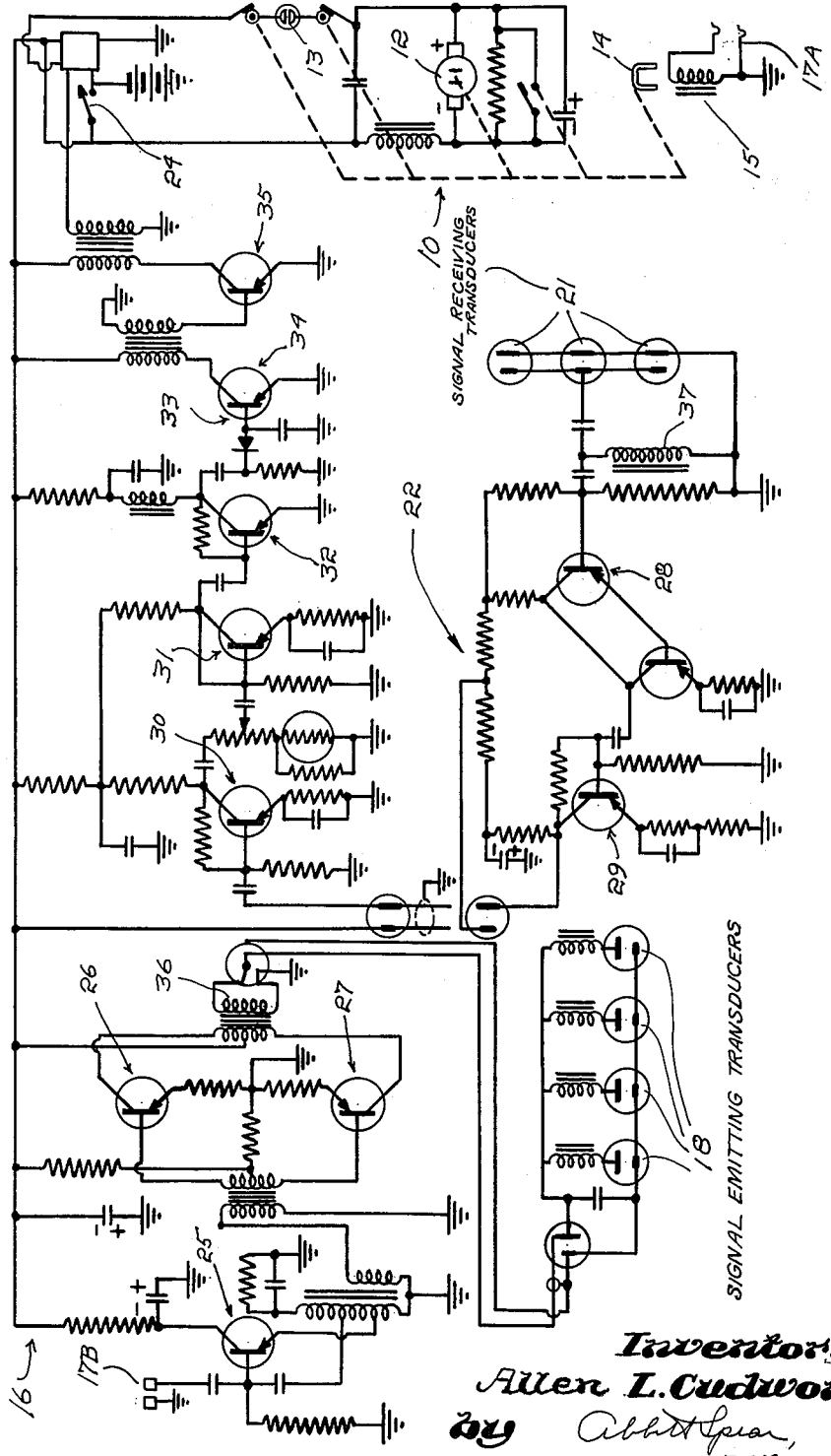

In the drawings:
FIGURE 1 is a somewhat schematic view of a device in accordance with the invention;
FIGURE 2 is a partly sectioned view of the indicator;
FIGURE 3 is a schematic view of a typical circuit used in the transmitting of high frequency electrical signals, a circuit for receiving them, and of the indicator including the parts of both circuits that it contains, and
FIGURE 4 is a view illustrating the backing of a truck, equipped with a device in accordance with the invention, towards a dock, with a child entrant of the danger zone.

A device in accordance with the invention includes an ultrasonic echo ranging system including an indicator 10 having an arm 11 rotated by a motor 12 and provided at one end with a neon or other bulb 13 of the gaseous discharge type and at the other with a permanent magnet 14. A pick-up coil 15, see FIGURE 3, in the indicator 10 is so positioned that on each pass of the magnet 14 relative thereto a pulse is generated and delivered to the transmitter 16 with which it has a detachable connection, the sections of which are indicated at 17A and 17B.

High frequency electrical signals are delivered by the transmitter 16 to a series of signal emitting transducers 18 which are indicated as being mounted in transversely spaced relationship on the rear bumper 19 of the generally indicated truck 20.

Such a system also includes a series of signal receiving transducers 21, shown as an efficient arrangement, as carried by the bumper 19, one between each two emitter transducers 18. The signal receiving transducers 21 are connected to a generally indicated receiver 22 where reflected signals are converted into electrical pulses of sufficient magnitude to flash the bulb 13.

While the circuitry of the signal emitting and signal receiving systems is largely conventional, as has been stated, it is fully shown in FIGURE 3 and is detailed to some extent as is necessary to understand the operation of the device and its emergency or danger signalling circuit which is generally indicated at 23 and shown in detail in FIGURE 1.

Whenever the driver of the vehicle shifts into reverse, the switch 24 is closed and the rotor of the motor 12 begins to revolve at, say, 1440 r.p.m. and each time the magnet 14 passes the coil 15, a trigger pulse is generated and fed into the base of the transistor 25 causing it to oscillate for a few cycles at 40,000 cycles per second, the oscillation occurring for approximately 0.5 millisecond and producing a train of 40K c.p.s. pulses which are amplified by the generally indicated stages 26 and 27 and thence fed to the signal emitting transducers 18 causing their barium titanite discs to vibrate and generate pulses of ultrasonic energy.

As each pulse strikes an obstacle of appreciable size, it is reflected and returned to the signal receiving transducers 21 and causes their discs to vibrate and generate electrical signals that are fed into the base of the transistor 28 and thence through the generally indicated amplifying stages 29, 30, 31, and 32.

The amplified pulses are fed by a detector 33 as a series of pulses to amplifiers 34, and 35 so that they are of sufficient magnitude to flash the bulb 13.

Magnetic coupling between the transmitter 16 and the receiver 2, as between the coils 36 and 37, is employed to deliver a pulse to the receiver 22 each time the oscillator is triggered and the consequent flashing of the bulb 13 establishes the "zero" reference line on the indicator dial 38. Because of the speed of sound in the air, flashing of the bulb 13, due to reflected sound pulses, is delayed and the distance of the reflecting object is determined by the angular displacement of the radial line of light relative to the "zero" line because of the turning of the bulb supporting arm 11.

In practice, the system is designed to produce a signal in the form of a bright radial line for each object of appreciable size within a predetermined range, say 6 inches to 25 feet, and as the transducers are spaced transversely of the rear of the vehicle, the operator has visual signals of objects in that range in the path of his vehicle, when being backed, and the distance of such objects from the rear of the vehicle so that he can back it accurately into a proper loading or unloading position, relative to, for example, a dock 39, simply by watching the indicator 10 which will show him when the rear of his vehicle is approximately six inches therefrom. The indicator 10 may be located wherever it can be most readily observed by the operator.

In accordance with the invention, the emergency or danger signalling circuit 23 becomes operative when an object is within a predetermined short distance of the rear of the vehicle and includes a photo-sensitive detector 40, in practice a cadmium sulfide photocell, positioned in a tubular housing 41 mounted on and extending radially through the wall 42 of the indicator 10 in such a position that only radial light lines indicating an object within, say, six inches to three feet of the rear of the truck, will change the electrical resistance of the detector 40.

As each radial light line is actually flashing many times a second, the corresponding changes of the photocells resistance modulates the base current of the amplifying stage 43 to which the detector 40 is capacitatively coupled as at 44 and which includes a gain control 45. The capacitative coupling 44 makes it unnecessary to reset the desired alarm threshold for changing ambient light conditions. The A.C. output of the first stage is rectified and amplified as at 46 and fed to a switching transistor 47 whose collector circuit 48 is shown as including a bell 49 thus to provide an audible signal that an object is dangerously close to the rear of the vehicle. If that object is the dock, for example, a warning is given in time for a safe stop and such warning is extremely important in the event a person tries to pass between the rearwardly moving vehicle and an object such as the dock or another vehicle.

I claim:

1. In a device for use in a vehicle for indicating the distance between the vehicle and an object towards which it is backing, an indicator including a bulb of the gaseous discharge type, a permanent magnet spaced therefrom, and means to rotate said bulb and said magnet about a common axis, pulse generating means including a pick-up coil in said indicator and so disposed relative to the path of said magnet as to generate a pulse on each pass of said magnet, said generating means including a series of signal emitting transducers supported transversely and disposed rearwardly of the vehicle, and signal receiving means for receiving pulses reflected from an object within a predetermined range and including said bulb, a series of rearwardly disposed signal receiving transducers disposed transversely of the rear of said vehicle, and means to convert the received signals into electric bulb-flashing pulses, said generating means delivering pulses directly to said receiving means to establish a zero reference flashing of said bulb.

2. The device of claim 1 in which the transducers of the two series are transversely alined and alternated in their disposition.

3. In a device for use in a vehicle for indicating the distance between the vehicle and an object towards which it is backing, an indicator including a bulb of the gaseous discharge type, a permanent magnet spaced therefrom, and means to rotate said bulb and said magnet about a common axis, pulse generating means including a pick-up coil in said indicator and so disposed relative to the path of said magnet as to generate a pulse on each pass of said magnet, said generating means including a series of signal emitting transducers supported transversely and disposed rearwardly of the vehicle, signal receiving means for receiving pulses reflected from an object within a predetermined range and including said bulb, a series of rearwardly disposed signal receiving transducers disposed transversely of the rear of said vehicle, and means to convert the received signals into electric bulb-flashing pulses, said generating means delivering pulses directly to said receiving means to establish a zero reference flashing of said bulb, and a circuit including a photo-sensitive cell mounted in said indicator to be exposed to pick up flashes of said bulb in a limited part of said range close to the zero reference flashing but shielded therefrom, said circuit also including a danger signalling device.

4. In a device for use in a vehicle for indicating the distance between the vehicle and an object towards which it is backing, an indicator including a bulb of the gaseous discharge type, a permanent magnet spaced therefrom, and means to rotate said bulb and said magnet about a common axis, pulse generating means including a pick-up coil in said indicator and so disposed relative to the path of said magnet as to generate a pulse on each pass of said magnet, said generating means including a series of signal emitting transducers supported transversely of and disposed rearwardly of the vehicle, signal receiving means for receiving pulses reflected from an object within a predetermined range and including said bulb, a series of rearwardly disposed signal receiving transducers disposed transversely of the rear of said vehicle, and means to convert the received signals into electric bulb-flashing pulses, said generating means delivering pulses directly to said receiving means to establish a zero reference flashing of said bulb and a circuit including a variable resistance, and a photo-sensitive cell mounted in said indicator to be exposed to pick up flashes of said bulb in a limited part of said range close to the zero reference flashing but shielded therefrom, said circuit also including a danger signalling device, said variable resistance establishing the threshold at which said device is operated.

5. In a device for use in a vehicle for indicating the distance between the vehicle and an object towards which it is backing, an indicator including a bulb of the gaseous discharge type, a permanent magnet spaced therefrom, and means to rotate said bulb and said magnet about a common axis, pulse generating means including a pick-up coil in said indicator and so disposed relative to the path of said magnet as to generate a pulse on each pass of said magnet, said generating means including a series of signal emitting transducers supported transversely of and disposed rearwardly of the vehicle, signal receiving means for receiving pulses reflected from an object within a predetermined range and including said bulb, a series of rearwardly disposed signal receiving transducers disposed transversely of the rear of said vehicle, and means to convert the received signals into electric bulb-flashing pulses, said generating means delivering pulses directly to said receiving means to establish a zero reference flashing of said bulb, a photo-sensitive cell mounted in said indicator to be exposed to pick up flashes of said bulb in a limited part of said range close to the zero reference flashing but shielded therefrom, a circuit also including a danger signalling device, and a capacitative coupling between said photo-sensitive cell and said circuit.

6. In a device for use in a vehicle for indicating the distance between the vehicle and an object towards which it is backing, an indicator including a bulb of the gaseous discharge type, a permanent magnet spaced therefrom, and means to rotate said bulb and said magnet about a common axis, pulse generating means including a pickup coil in said indicator and so disposed relative to the path of said magnet as to generate a pulse on each pass of said magnet, said generating means including a series of signal emitting transducers supported transversely of and disposed rearwardly of the vehicle, signal receiving means for receiving pulses reflected from an object within a predetermined range and including said bulb, a series of rearwardly disposed signal receiving transducers disposed transversely of the rear of said vehicle, and means to convert received signals into electric bulb-flashing pulses, said generating means delivering pulses directly to said receiving means to establish a zero reference flashing of said bulb, and a circuit including a photosensitive cell mounted in said indicator to be exposed to pick up flashes of said bulb in a limited part of said range close to the zero reference flashing but shielded therefrom, said circuit also including a switching transistor, and a bell located in the collector circuit of said switching transistor.

References Cited by the Examiner
UNITED STATES PATENTS

| | | | |
|---|---|---|---|
| 2,939,105 | 5/1960 | Fryklund | 340—1 |
| 2,943,296 | 6/1960 | Fryklund | 340—1 |
| 3,031,643 | 4/1962 | Sheftelman | 340—258 |
| 3,110,009 | 11/1963 | Bolton et al. | 340—38 |
| 3,122,719 | 2/1964 | Grieg | 340—1 |

NEIL C. READ, *Primary Examiner.*

A. H. WARING, *Examiner.*